3,431,219
CRYSTALLINE GALLIOSILICATES
Robert J. Argauer, Kensington, Md., assignor to Mobil Oil Corporation, a corporation of New York
No Drawing. Filed Mar. 8, 1967, Ser. No. 621,419
U.S. Cl. 252—455          19 Claims
Int. Cl. C01b 33/26, 33/28

ABSTRACT OF THE DISCLOSURE

A synthetic crystalline sodium galliosilicate zeolite having a composition expressed in terms of oxide mole ratios, as follows: $0.9 \pm 0.2$ $Na_2O:yGa_2O_3:zAl_2O_3:wSiO_2:xH_2O$ wherein $z$ equals 0 to 0.9, $y$ equals 0.1 to 1, $y+z$ equals 1, $w$ equals in excess of 3 to 6, and $x$ equals 3 to 12, said zeolite having an X-ray powder diffraction pattern essentially the same as that of crystalline aluminosilicate zeolite 13X. This crystalline zeolite may be obtained by: preparing an initial aqueous mixture having a pH of from about 10 to 14, the mixture having a composition, expressed in terms of oxide mole ratios, as follows:

$Na_2O/SiO_2$ from about 0.2 to 0.4,
$SiO_2/(Ga_2O_3+Al_2O_3)$ from about 7 to 30,
$Al_2O_3/Ga_2O_3$ from about 0 to 20,
$H_2O/Na_2O$ from about 25 to 60, to form a gel, maintaining the gel mixture at a temperature of from about 25 to 30° C. for a period of time from about 8 to 24 hours or longer, digesting at a temperature of from about 40 to 150° C. and preferably from about 80 to 110° C. for a time of from about 6 to 15 days, separating the gel, admixing therewith from about 0.5 to 2 volumes of sodium hydroxide (molar ratio $H_2O/Na_2O$ from about 25 to 60) per volume of gel, the resulting crystallization having a pH of from about 10 to 14, and crystallizing at a temperature of from about 40 to 150° C. and preferably from about 80 to 110° C. for a time of from about 1 to 7 days to thereby form crystals. Alternatively, a mixed crystalline sodium galliosilicate may be obtained by preparing an aqueous mixture having a pH of from about 10 to 14 and having a composition expressed in terms of oxide mole ratios as follows:

$Na_2O/SiO_2$ from about 0.2 to 0.4,
$SiO_2/(Ga_2O_3+Al_2O_3)$ from about 7 to 30,
$Al_2O_3/Ga_2O_3$ from about 1 to 20,
$H_2O/Na_2O$ from about 25 to 60, to form a gel, and maintaining the gel mixture at a temperature of from about 40 to 150° C. for a time of from about 3 to 20 days to form said crystals. The sodium content of the crystalline zeolite may be substantially replaced by subjecting the zeolite to ion exchange with a solution containing such cations as hydrogen, ammonium, metal cations from Groups I to VIII of the Periodic Table, or mixtures thereof, to provide a material highly suitable for the catalytic conversion of hydrocarbons.

BACKGROUND OF THE INVENTION

Field of the invention

Certain crystalline, hydrated, metal aluminosilicates, metal aluminogermanates, metal galliosilicates, and metal galliogermaniates are referred to as zeolites.

Certain adsorbents, including certain zeolites, selectively adsorb molecules on the basis of the size and shape of the adsorbate molecule and are called molecular sieves. Molecular sieves have a sorption area available on the inside of a large number of uniformly sized pores of molecular dimensions. With such an arrangement, molecules of a certain size and shape enter the pores and are adsorbed, while larger or differently shaped molecules are excluded. Not all adsorbents behave in the manner of molecular sieves. The common adsorbents, charcoal and silica gel, for example, do not exhibit molecular sieve action.

The crystals of most zeolites are basically three-dimensional frameworks of $SiO_4$ and $AlO_4$ tetrahedrons cross-linked by the sharing of oxygen atoms. The electrovalence of each tetrahedron containing aluminum is balanced by the presence in the almuinosilicate framework of a cation such as an alkali metal ion. The void spaces in the framework are occupied by water molecules.

Dehydration to effect the loss of the water of hydration results in a crystal interlaced with channels of molecular dimensions that offer very high surface areas for the adsorption of foreign molecules.

Gallium, which in many instances behaves chemically similarly to aluminum, has been utilized in the synthesis of certain synthetic zeolites, including galliosilicates. Such galliosilicates, when crystalline, are essentially three-dimensional frameworks of $SiO_4$ and $GaO_4$ tetrahedrons cross-linked by the sharing of oxygen atoms. Thus, such materials are analogous to crystalline aluminosilicates, with gallium being substituted for aluminum in the crystal lattice.

Description of the prior art

U.S. Patent No. 2,882,244 describes zeolite X, a synthetic crystalline aluminosilicate that is isostructural with naturally occurring faujasite. The molar ratio of $SiO_2$ to $Al_2O_3$ in zeolite X never exceeds 3.0. Zeolite X, sometimes referred to as "zeolite 13X," has a characteristic X-ray powder diffraction pattern.

U.S. Patent No. 3,130,007 describes zeolite Y, a synthetic crystalline aluminosilicate that is somewhat similar to zeolite X, but wherein the molar ratio of $SiO_2/Al_2O_3$ is always in excess of 3 and generally up to about 6.

Barrer et al., in J. Chem. Soc. at 195 (1959) describe gallium analogs of aluminosilicate zeolites but do not describe galliosilicates having X-ray and sorption properties of faujasite.

Selbin et al., in 20 J. Inorg. Nucl. Chem. at 222 (1961), report the preparation of galliofaujasite wherein the $SiO_2/Ga_2O_3$ molar ratio does not exceed 2.5.

SUMMARY OF THE INVENTION

The invention relates to a synthetic crystalline sodium galliosilicate zeolite having a composition expressed in terms of oxide mole ratios, as follows: $0.9 \pm 0.2$ $Na_2O:yGa_2O_3:zAl_2O_3:wSiO_2:xH_2O$ wherein $z$ equals 0 to 0.9, $y$ equals 0.1 to 1, $y+z$ equals 1, $w$ equals in excess of 3 to 6, and $x$ equals 3 to 12, said zeolite having an X-ray powder diffraction pattern essentially the same as that of crystalline aluminosilicate zeolite 13X. This crystalline zeolite is prepared by: preparing an initial aqueous mixture having a pH of from about 10 to 14, the mixture having a composition, expressed in terms of oxide mole ratios, as follows:

Na$_2$O/SiO$_2$ from about 0.2 to 0.4,
SiO$_2$/(Ga$_2$O$_3$+Al$_2$O$_3$) from about 7 to 30,
Al$_2$O$_3$/Ga$_2$O$_3$ from about 0 to 20,
H$_2$O/Na$_2$O from about 25 to 60, to form a gel, maintaining the gel mixture at a temperature of from about 25 to 30° C. for a period of time of from about 8 to 24 hours or longer, and then digesting at a temperature of from about 40 to 150° C. and preferably from about 80 to 110° C. for a time of from about 6 to 15 days, separating the gel, admixing therewith from about 0.5 to 2 volumes of sodium hydroxide (molar ratio H$_2$O/Na$_2$O from about 25 to 60) per volume of gel, the resulting crystallization mixture having a pH of from about 10 to 14, and crystallizing at a temperature of from about 40 to 150° C. and preferably from about 80 to 110° C. for a time of from about 1 to 7 days to thereby form crystals. Alternatively, a mixed crystalline sodium gallioaluminosilicate may be obtained by preparing an aqueous mixture having a pH of from about 10 to 14 and having a composition expressed in terms of oxide mole ratios as follows:

Na$_2$O/SiO$_2$ from about 0.2 to 0.4,
SiO$_2$/(Ga$_2$O$_3$+Al$_2$O$_3$) from about 7 to 30,
Al$_2$O$_3$/Ga$_2$O$_3$ from about 1 to 20,
H$_2$O/Na$_2$O from about 25 to 60, to form a gel, and maintaining the gel mixture at a temperature of from about 40 to 150° C. for a time of from about 3 to 20 days to form said crystals. The sodium content of the crystalline zeolite may be substantially replaced by subjecting the zeolite to ion exchange with a solution containing such cations as hydrogen, ammonium, metal cations from Groups I to VIII of the Periodic Table, or mixtures thereof, to provide a material highly suitable for the catalytic conversion of hydrocarbons, particularly for catalytic cracking, hydrocracking, and the like.

DESCRIPTION OF SPECIFIC EMBODIMENTS

The chemical formula for the crystalline sodium galliosilicate zeolite of the present invention, expressed in terms of moles of oxides, may be written as

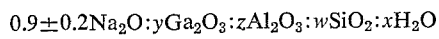

0.9±0.2Na$_2$O:$y$Ga$_2$O$_3$:$z$Al$_2$O$_3$:$w$SiO$_2$:$x$H$_2$O wherein $z$=0 to 0.9,
$y$=0.1 to 1,
$y$+$z$=1,
$w$=in excess of 3 to 6, and
$x$=3 to 12.

The sodium galliosilicate zeolite has a characteristic X-ray powder diffraction pattern which is essentially the same as that of crystalline sodium aluminosilicate zeolite 13X ("zeolite X"), described in U.S. Patent No. 2,882,244.

In producing the sodium galliosilicate zeolite, representative reactants as the source of gallia include sodium gallate (NaGaO$_2$) or precursors thereof such as, e.g., gallium oxide, gallium hydroxide, or gallium salts.

Silica may be obtained from sodium silicate, silica gels, silicic acid, aqueous colloidal silica sols and reactive amorphous solid silicas. The preparation of typical silica sols which are suitable for use in the process of the present invention are described in U.S. Patent No. 2,574,902 and U.S. Patent No. 2,597,872. Typical of the group of reactive amorphous solid silicas, preferably having an ultimate particle size of less than 1 micron are such materials as fume silicas, chemically precipitated silicas, and precipitated silica sols, and including silicas such as those known by such trade names as "Santocel," "Cab-o-sil," "Hi-Sil," and "QUSO." Finely divided "Vycor" glass powder may also be used. Sodium hydroxide may supply the sodium ion and also assist in controlling pH.

The invention also contemplates the preparation of a "mixed" aluminogalliosilicate. In this instance, the reactants will additionally include a source of alumina such as, e.g., sodium aluminate, activated alumina, gamma alumina, alumina trihydrate, or the like.

The crystalline sodium galliosilicate is advantageously prepared by admixing gallium hydroxide, sodium hydroxide, a source of silica, e.g., a colloidal silica sol, and, if a "mixed" aluminogalliosilicate is desired, a source of alumina, the mixture having a pH of from about 10 to 14 and having a composition, expressed in terms of oxide mole ratios, as follows:

Na$_2$O/SiO$_2$ from about 0.2 to 0.4,
SiO$_2$/(Ga$_2$O$_3$+Al$_2$O$_3$) from about 7 to 30,
Al$_2$O$_3$/Ga$_2$O$_3$ from about 0 to 20,
H$_2$O/Na$_2$O from about 25 to 60.

This mixture results in the formation of a gel. The gel mixture is maintained at a temperature of from about 25 to 30° C. for a period of time of from about 8 to 24 hours. Of course, even longer periods of time may be employed, but to no particular advantage. This mild heat treatment is believed to effect nucleation so as to provide sites for subsequent crystal formation.

The gel mixture is then digested by heating to a temperature of from about 9 to 100° C. for a time of from about 6 to 12 days. Possibly some crystallization occurs by virtue of this digestion. However, it is believed that most of the crystallization occurs during the subsequent digestion described hereinafter.

The gel is separated from the mother liquor, as by filtration, and then admixed with sodium hydroxide (molar ratio H$_2$O/Na$_2$O from about 25 to 60) such that the resulting crystallization mixture has a pH of from about 10 to 14. The proportions as between the gel and the sodium hydroxide should be from about 0.5 to 2 volumes of sodium hydroxide per volume of gel.

The crystallization mixture is then digested at a temperature of from about 40 to 150° C. and preferably from about 80 to 110° C. for a time of from about 1 to 7 days to thereby form crystals of sodium galliosilicate (or crystals of sodium gallioaluminosilicate where a source of alumina has been included in the initial reactant mixture).

As noted, the synthetic crystalline sodium galliosilicate zeolite produced by the foregoing process has a composition, expressed in terms of oxide mole ratios, as follows:

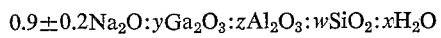

0.9±0.2Na$_2$O:$y$Ga$_2$O$_3$:$z$Al$_2$O$_3$:$w$SiO$_2$:$x$H$_2$O wherein $z$ equals 0 to 0.9, $y$ equals 0.1 to 1, $y$+$z$ equals 1, $w$ equals in excess of 3 to 6 and preferably is from about 3.5 to 6.0, and $x$ equals 3 to 12. This zeolite shows an X-ray powder diffraction pattern which is essentially the same as that of crystalline aluminosilicate zeolite 13X.

The invention also comprehends an alternative method for preparing a "mixed" sodium gallioaluminosilicate wherein, referring to the foregoing formula, $z$=at least about 5. This method involves preparing an initial aqueous mixture having a pH of from about 10 to 14 and having a composition expressed in terms of oxide mole ratios as follows:

Na$_2$O/SiO$_2$ from about 0.2 to 0.4,
SiO$_2$/(Ga$_2$O+Al$_2$O$_3$) from about 7 to 30,
Al$_2$O$_3$/Ga$_2$O$_3$ from about 1 to 20,
H$_2$O/Na$_2$O from about 25 to 60, to form a gel. The gel mixture is then maintained at a temperature of from about 40 to 150° C. for a time of from about 3 to 20 days to thereby form sodium gallioaluminosilicate crystals. Preferred conditions for effecting crystallization of the gel mixture are a temperature of from about 70 to 150° C. and most preferably 80 to 110° C. and a time of from about 6 to 15 days.

The present invention further contemplates replacing a substantial portion of the sodium content of the crystalline sodium galliosilicate or gallioaluminosilicate by treatment with an ion-exchange solution containing cations such as, e.g., hydrogen, ammonium, metal cations wherein the metal is from Groups I–VIII of the Periodic Table, or mixtures thereof. Desirably the ion exchange is carried out under such conditions as to replace at least 80 weight percent of the sodium, preferably at least 90 percent, and most preferably at least 95 percent, with cations from the ion exchange solution.

The ion exchange is effected by treatment of the sodium galliosilicate with a fluid medium containing cations which are to be exchanged for the sodium. Salts represent the typical source of the cations.

The sodium galliosilicate can be contacted with a non-aqueous or aqueous fluid medium comprising a gas, polar solvent or water solution containing the desired cations therein to effect ion exchange.

Water is the preferred medium for reasons of economy and ease of preparation in large scale operations involving continuous or batchwise treatment. Similarly, for this reason, organic solvents are less preferred but can be employed providing the solvent permits ionization of the compound which is the source of the cations. Typical solvents include cyclic and acyclic ethers such as dioxane, tetrahydrofuran, ethyl ether, diethyl ether, diisopropyl ether, and the like; ketones such as acetone and methyl ethyl ketone; esters such as ethyl acetate, alcohols such as ethanol, propanol, butanol, etc.; and miscellaneous solvents such as dimethylformamide, and the like.

The cation may be present in the fluid medium in an amount varying within wide limits. For instance, when a salt is employed as the source of cations, the concentration of the salt may be from as low as about 1% by weight of the solution to saturation. In a continuous exchange the concentration will generally be from about 1 to 5%, whereas in batch exchanges higher concentrations are frequently employed.

The treatment with the fluid medium should desirably be carried out until such time as the alkali metal cations originally present are substantially exhausted. Alkali metal cations, if present in the treated galliosilicate, tend to suppress or limit catalytic properties, the activity of which, as a general rule, decreases with increasing content of these metallic cations.

Effective treatment with the fluid medium to obtain a modified galliosilicate having high catalytic activity will vary, of course, with the duration of the treatment and the temperature at which the treatment is carried out. Elevated temperatures tend to hasten the speed of treatment whereas the duration thereof varies inversely with the general concentration of ions in the fluid medium. In general, the temperatures employed range from below ambient room temperature of 24° C. up to temperatures below the decomposition temperature of the galliosilicate. Following the fluid treatment, the treated galliosilicate is washed with water, preferably distilled water, until the effluent wash water has a pH value of wash water, i.e., between 5 and 8. The galliosilicate material is thereafter analyzed for metallic content by methods well known in the art. Analysis also involves analyzing the effluent wash for anions obtained in the wash as a result of the treatment, as well as determination of and correction for anions that pass into the effluent wash from soluble substances, or decomposition products of insoluble substances, which are otherwise present in the galliosilicate as impurities.

The treatment of the galliosilicate with the fluid medium or media may be accomplished in a batchwise or continuous method under atmospheric, superatmospheric or subatmospheric pressures. A solution of cations in the form of a molten material, vapor, aqueous or non-aqueous solution may be passed slowly through a fixed bed of aluminosilicate. If desired, hydrothermal treatment or corresponding non-aqueous treatment with polar solvents may be effected by introducing the galliosilicate and fluid medium into a closed vessel maintained under autogeneous pressure. Similarly, treatments involving fusion or vapor phase contact may be employed.

A wide variety of compounds can be employed with facility as a source of the desired cations. Thus depending upon the specific cation to be introduced, suitable compounds may include chlorides, bromides, iodides, carbonates, bicarbonates, sulfates, sulfides, thiocyanates, peroxysulfates, acetates, benzoates, citrates, fluorides, nitrates, formates, propionates, butyrates, valecates, lactates, malanates, oxalates, palmitates, hydroxides, tartrates, and the like. The only limitation on the particular salt or salts employed is that it be sufficiently soluble in the fluid medium in which it is used to give the necessary ion transfer.

Where a rare earth cation is to be exchanged, representative rare earth metals are cerium, lanthanum, praseodymium, neodymium, illinium, samarium, europium, gadolinium, terbium, dysprosium, holmium, erbium, thulium, scandium, yttrium, and lutecium. Of course, the rare earth metal salt employed can either be the salt of a single rare earth metal or mixtures of rare earth metals. As hereinafter referred to, a rare earth chloride solution is a mixture of rare earth chlorides consisting essentially of the chlorides of lanthanum, cerium, neodymium and praseodymium with minor amounts of samarium, gadolinium and yttrium. Rare earth chloride solutions are commercially available and the ones specifically referred to in the examples contain the chlorides of the rare earth mixture having the relative composition cerium (as $CeO_2$) 48% by weight, lanthanum (as $La_2O_3$) 24% by weight, praseodymium (as $Pr_6O_{11}$) 5% by weight, neodymium (as $Nd_2O_3$) 17% by weight, samarium (as $Sm_2O_3$) 3% by weight, gadolinium (as $Gd_2O_3$) 2% by weight, and other rare earth oxides 0.8% by weight. Didymium chloride is also a mixture of rare earth chlorides but having a lower cerium content. It consists of the following rare earths determined as oxides: lanthanum 45–56% by weight, cerium 1–2% by weight, praseodymium 9–10% by weight, neodymium 32–33% by weight, samarium 5–7% by weight, gadolinium 3–4% by weight, yttrium 0.4% by weight, and other rare earths 1–2% by weight. It is to be understood that other mixtures of rare earths are also applicable, although lanthanum, neodymium, praseodymium, samarium and gadolinium as well as mixtures of rare earth cations containing a predominant amount of one or more of the above cations are preferred since these metals provide optimum activity for hydrocarbon conversion, including catalytic cracking.

It is preferred that the ion exchange be carried out such that there be a minimum amount of alkali metal cations associated with the crystalline galliosilicate since the presence of these metals tends to suppress or limit catalytic properties, the activity of which, as a general rule, decreases with increasing content of alkali metal cations. Thus, the residual sodium content should be less than 2% by weight, and preferably less than 1%.

Where the rare earth form of the crystalline galliosilicate is obtained it is preferred that it have from 0.5 to 1.0 equivalent per gram atom of gallium (or gallium plus aluminum when dealing with a "mixed" gallioaluminosilicate) of rare earth metal cations. Thus, in a particularly preferred embodiment, rare earth metal cations are substantially the only metallic cations associated with the galliosilicate.

The so-exchanged products are particularly suitable for use as catalysts in the conversion of hydrocarbons, in particular, for catalytic cracking and hydrocracking.

Where the catalyst is employed for cracking reactions, it is preferred that the sodium content be substantially replaced with metal cations wherein the metal is a rare earth metal or is from Groups I–A, II–A, III–A, or III–B of the Periodic Table, with particular preference being accorded the following metals: Cs, Mg, Ca, La, and Al. For hydrocracking, the catalyst is preferably one wherein the replacing metal cation is from Group V–B, VI–B, or VIII, with particular preference being accorded the following metals: Cr, Mo, Co, Ni, and Pt.

The following examples will further illustrate this invention. All parts are by weight unless otherwise stated.

EXAMPLE 1

Reaction composition:

| | Moles |
|---|---|
| Moles $Ga_2O_3$ | 0.11 |
| Moles $Na_2O$ | 0.3 |
| Moles $H_2O$ | 12.6 |
| Moles $SiO_2$ | 1.02 |

Solution A.—0.22 mole gallium hydroxide dissolved in 24 grams NaOH and 83 ml. water.

Solution B.—205 grams silica sol, 30% $SiO_2$ ("LS Ludox"). Solution B was added to solution A at room temperature with stirring and the resultant gel, after sitting at room tempertaure overnight, was heated to 200° F. After four days of heat treatment the still amorphous gel was filtered and the solids returned to 227 ml. of 2.64 N sodium hydroxide. Crystals of 12 microns in size formed after one day at 200° F. By the second day the crystals had grown to 20 microns.

Analytical results:

Composition, wt. percent:

| | |
|---|---|
| $Na_2O$ | 13.6 |
| $Ga_2O_3$ | 36.4 |
| $SiO_2$ | 52.3 |

Surface area: 565 m.²/g.
Crystallinity: ≈to commercial 13X
Mole ratio: $1.1Na_2O:1.0Ga_2O_3:4.5SiO_2$ The foregoing crystalline sodium galliosilicate was tested for adsorptive properties. In these tests, a weighed sample was contacted with the desired pure adsorbate vapor in an adsorption chamber at a pressure less than the vapor-liquid equilibrium pressure of the adsorbate at room temperature. This pressure was kept constant during the adsorption period. Adsorption was complete when a constant pressure in the adsorption chamber was reached. The samples were then removed and weighed. The increase in weight was calculated as the adsorption capacity of the sample.

Sorption capacity, wt. percent:

| | |
|---|---|
| Cyclohexane | 16.2 |
| n-Hexane | 15.6 |
| Water | 25.3 |

EXAMPLE 2

Reaction composition: Same at that of Example 1.

After keeping the reaction mixture at room temperature overnight, it was heat treated at 200° F. for 14 days. The amorphous gel was filtered and added to 227 ml. of 2.64 N sodium hydroxide. After one day additional heat treatment at 200° F., the product was crystalline, the crystals being from about 8 to 12 microns in size.

Analytical results:

Composition, wt. percent:

| | |
|---|---|
| $SiO_2$ | 45.2 |
| $Ga_2O_3$ | 42.8 |
| $Na_2O$ | Not obtained |

Crystallinity: ≈to commercial 13X.

The mole ratio $Na_2O:Ga_2O_3:SiO_2$ was 1:1:3.3.

Sorption capacity, wt. percent:

| | |
|---|---|
| Cyclohexane | 15.6 |
| Water | 26.5 |

EXAMPLE 3.—MIXED ALUMINOGALLIOSILICATE

Reaction composition: Molar ratio $$Ga_2O_3/Al_2O_3 = 1/10$$

| | Moles |
|---|---|
| $Ga_2O_3$ | 0.033 |
| $Na_2O$ | 1.08 |
| $Al_2O_3$ | 0.33 |
| $H_2O$ | 43 |
| $SiO_2$ | 3.4 |

Solution A.—0.066 mole gallium hydroxide was dissolved in 5 g. of sodium hydroxide and 50 ml. water and added to a solution containing 75 g. sodium aluminate (44% $Al_2O_3$) dissolved in 241 ml. water and 44 grams sodium hydroxide.

Solution B: 678 g. LS Ludox (30% $SiO_2$).—Solution B was added to solution A with rapid stirring and the resultant gel and kept at room temperature overnight and then heated to 200° F. Some crystalline material was evident after 6 days of heat treatment at 200° F. The material was mainly crystalline after 12 days.

Analytical results:

| | Wt. percent |
|---|---|
| $Na_2O$ | 10.9 |
| $SiO_2$ | 66.1 |

$Al_2O_3 + Ga_2O_3$: Total moles 0.208 per 100 g. sample.

Assuming that $Ga_2O_3$ is present in the product in the same ratio as in reaction composition:

| | Wt. percent |
|---|---|
| $Al_2O_3$ | 19.4 |
| $Ga_2O_3$ | 3.5 |
| Total oxides $Al_2O_3 + Ga_2O_3$ | 22.9 |

| | |
|---|---|
| $Al_2O_3 + Ga_2O_3$ | 22.9 |
| $Na_2O$ | 10.9 |
| $SiO_2$ | 66.1 |
| Total, as oxides | 99.9 |

The mole ratio $Na_2O:(Al_2O_3+Ga_2O_3):SiO$ was 0.84:1:5.25.

Sorption capacity:

| | Wt. percent |
|---|---|
| Cyclohexane | 19.5 |
| Water | 27.5 |

Spectrographic analysis shows the presence of gallium in product.

EXAMPLE 4

A repeat of Example 1 was made using twice the amounts of materials. The reaction mixture was heat treated at 200° F. for 5 days (pH 10.8), filtered, and the gel added to fresh sodium hydroxide (pH of mixture=12.4). Seven additional days of heat treatment at 200° F. were needed for nearly complete crystallization.

Analytical results:

Composition, wt. percent:

| | |
|---|---|
| $Na_2O$ | 12.1 |
| $Ga_2O_3$ | 39.2 |
| $SiO_2$ | 47.4 |
| Total oxides | 98.7 |

Molar ratio $SiO_2/Ga_2O_3 = 3.8$

Sorption capacity, wt. percent:

| | |
|---|---|
| Cyclohexane | 16.4 |
| Water | 26.7 |

EXAMPLES 5–7

A sample of the product from Example 3 was continuously exchanged with aqueous rare earth-ammonium chloride (5% $RECl_3·6H_2O$, 2% $NH_4Cl$; 180° F.) to a sodium level of 0.43 wt. percent. Three different steaming conditions were employed. Thereafter the samples were evaluated for catalytic cracking activity using Mid Continent Wide Range Gas Oil. The test conditions and results are shown in the following table.

TABLE.—CATALYTIC ACTIVITY OF RARE EARTH EXCHANGED ($Ga_2O_3/Al_2O_3=0.1$) Y FAUJASITE

| Example No. | 5 | 6 | 7 |
|---|---|---|---|
| Steaming,[1] time (hours) | 24 | 48 | 72 |
| | After exchange with $RECl_3+NH_4Cl$ | | |
| Composition, percent: | | | |
| $Na_2O$ | 0.58 | | |
| $RE_2O_3$ | 19.1 | | |
| $Ga_2O_3+Al_2O_3$, mol/100 g. (sample) | 0.194 | | |
| $SiO_2$, percent | 59.4 | | |
| Surface Area, m.²/g | 548 | | |
| Steamed | 457 | 433 | 393 |
| Catalytic Evaluation: | | | |
| Conditions: | | | |
| LHSV | 16 | 16 | 16 |
| C/O | 0.38 | 0.38 | 0.38 |
| Temp | 900 | 911 | 906 |
| Conversion, vol. percent | 68.0 | 69.0 | 65.6 |
| $C_5$+Gasoline, vol. percent | 57.6 | 58.8 | 57.0 |
| Total $C_4$'s, vol. percent | 13.6 | 14.1 | 12.1 |
| Dry Gas, wt. percent | 6.0 | 5.8 | 5.5 |
| Coke, wt. percent | 2.1 | 2.1 | 1.6 |
| Delta Advantage Over "Durabead 5"[2]: | | | |
| $C_5$+Gasoline, vol. percent | +4.5 | +5.4 | +4.9 |
| Total $C_4$'s, vol. percent | −2.1 | −2.0 | −2.9 |
| Dry Gas, wt. percent | −0.9 | −1.3 | −1.0 |
| Coke, wt. percent | −2.0 | −2.3 | −2.0 |

[1] At 1,200° F. with 100% steam at 15 p.s.i.g.
[2] Composite catalyst made up of a matrix of 87% $SiO_2$–13% $Al_2O_3$ having dispersed therein rare earth zeolite X in an amount equal to 7.5% of the composite.

EXAMPLE 8

A sample of the product from Example 4 was base exchanged with aqueous ammonium chloride solution (2% $NH_4Cl$, 180° F.) to a sodium level of 0.44 wt. percent. The product was mainly amorphous to X-rays and had an alpha[1] value of 3.5 unsteamed.

EXAMPLE 9

Another sample of the product from Example 4 was base exchanged with aqueous rare earth chloride solution (5% $RECl_3·6H_2O$, 180° F.) to a sodium level of 0.66 wt. percent. The product was about 40% crystalline to X-rays, and had an alpha value of 5.0 unsteamed.

EXAMPLE 10

Another sample of the product from Example 4 was exchanged with an aqueous $CaCl_2$ solution (2% $CaCl_2$) to a sodium level of 0.60 wt. percent. The zeolite had a crystallinity of 100%. The alpha value unsteamed was 9.7. After steaming for 24 hours at 1200° F. with 100% steam at 15 p.s.i.g. the alpha value was 0.16.

Variations can, of course, be made without departing from the spirit and scope of my invention.

Having thus described my invention, what I desire to secure and hereby claim by Letters Patent is:

1. A synthetic crystalline sodium galliosilicate zeolite having a composition expressed in terms of oxide mole ratios, as follows:

$$0.9\pm0.2Na_2O:yGa_2O_3:zAl_2O_3:wSiO_2:xH_2O$$

wherein z equals 0 to 0.9, y equals 0.1 to 1, y+z equals 1, w equals in excess of 3 to 6, and x equals 3 to 12, said zeolite having an X-ray powder diffraction pattern essentially the same as that of crystalline aluminosilicate zeolite 13X.

2. The crystalline product of claim 1 wherein w is from about 3.5 to 6.0 and wherein z=0 and y=1.0.

3. A method of preparing the crystalline product of claim 1 comprising preparing an initial aqueous mixture, said mixture having a pH of from about 10 to 14 and having a composition, expressed in terms of oxide mole ratios, as follows:

$Na_2O/SiO_2$ from about 0.2 to 0.4,
$SiO_2/(Ga_2O_3+Al_2O_3)$ from about 7 to 30,
$Al_2O_3/Ga_2O_3$ from about 0 to 20,
$H_2O/Na_2O$ from about 25 to 60, to thereby form a gel, maintaining the gel mixture at a temperature of from about 25 to 30° C. for a period of time of at least about 8 hours, digesting at a temperature of from about 40 to 150° C. for a time of from about 6 to 15 days, separating said gel, admixing therewith sodium hydroxide having a molar ratio of $H_2O/Na_2O$ of from about 25 to 60, the admixture being in such proportions that from about 0.5 to 2 volumes of sodium hydroxide are employed per volume of gel, the resulting crystallization mixture having a pH of from about 10 to 14, and crystallizing at a temperature of from about 40 to 150° C. for a time of from about 1 to 7 days.

4. The method of claim 3 wherein said initial mixture is formed by admixing sodium hydroxide, a source of silica, and sodium gallate or a precursor thereof.

5. The method of claim 4 wherein said initial mixture additionally includes a source of alumina.

6. A method of preparing a composition suitable for use in the catalytic conversion of hydrocarbons comprising ion exchanging the crystalline product of claim 1 with a solution containing cations selected from the group consisting of hydrogen, ammonium, metals from Group I to VIII of the Periodic Table, and mixtures thereof, said ion exchange being carried out under such conditions as to replace a substantial portion of the sodium content of said crystalline product with cations from said ion exchange solution.

7. The method of claim 6 wherein the ion exchange is carried out such that the residual sodium content of said crystalline product is less than about 1 weight percent of said crystalline product on a dry basis.

8. The method of claim 6 wherein said cations include rare earth cations.

9. The method of claim 6 wherein said cations include ammonium ions.

10. The method of claim 6 wherein said cations include calcium ions.

11. The product of claim 1 wherein said zeolite has been ion exchanged with cations selected from the group consisting of hydrogen, ammonium, metals from Groups I to VIII of the Periodic Table and mixtures thereof, a substantial portion of the sodium content of said zeolite having been replaced by said cation.

12. The method of claim 6 wherein the cations in said solution are metal cations from Group I–A, II–A, III–A or III–B of the Periodic Table.

13. The product according to claim 11 wherein said metal cations are selected from Groups I–A, II–A, III–A, and III–B of the Periodic Table.

14. The method of claim 6 wherein the cations in said solution are metal cations from Group V–B, VI–B or VIII of the Periodic Table.

15. The product according to claim 11 wherein said metal cations are selected from Groups V–B, VI–B, and VIII of the Periodic Table.

16. A method of preparing the crystalline product of claim 1 wherein z equals at least about 0.5 comprising preparing an aqueous mixture having a pH of from about 10 to 14 and having a composition expressed in terms of oxide mole ratios as follows:

$Na_2O/SiO_2$ from about 0.2 to 0.4,
$SiO_2/(Ga_2O_3+Al_2O_3)$ from about 7 to 30,
$Al_2O_3/Ga_2O_3$ from about 1 to 20,
$H_2O/Na_2O$ from about 25 to 60, to form a gel, and maintaining the gel mixture at a temperature of from about 40 to 150° C. for a time of from about 3 to 20 days to thereby form sodium gallioaluminosilicate crystals.

---

[1] Alpha value is an indication of cracking activity. The standard alpha test is described in a letter to the editor entitled "Superactive Crystalline Aluminosilicate Hydrocarbon Catalysts," by P. W. Weisz and J. N. Miale, Journal of Catalysis, vol. 4, No. 4, August 1965, pp. 527–529.

17. The method of claim 16 wherein said aqueous mixture is formed by admixing sodium hydroxide, a source of silica, a source of alumina, and sodium gallate or a precursor thereof.

18. The method of claim 17 wherein the gel mixture is maintained at a temperature of from about 70 to 150° C. for from about 6 to 15 days.

19. A synthetic crystalline galliosilicate zeolite characterized by a silica to gallia mole ratio in excess of 3 and an X-ray powder diffraction pattern assentially the same as crystalline aluminosilicate zeolite X.

References Cited

UNITED STATES PATENTS

| | | | |
|---|---|---|---|
| 3,033,778 | 5/1962 | Friletta | 208—120 |
| 3,130,006 | 4/1964 | Rabo et al. | 23—110 |

OTHER REFERENCES

"Hydrothermal Chemistry of the Silicates," by Barrer et al., Journal of the Chemical Society Part (I) pp. 195–208 (1959).

DELBERT E. GANTZ, *Primary Examiner.*

HERBERT LEVINE, *Assistant Examiner.*

U.S. Cl. X.R.

23—113; 208—111, 120

PO-1050
(5/69)

UNITED STATES PATENT OFFICE
CERTIFICATE OF CORRECTION

Patent No. 3,431,219        Dated Issued March 4, 1969

Inventor(s) Robert J. Argauer

It is certified that error appears in the above-identified patent and that said Letters Patent are hereby corrected as shown below:

Column 2, line 16 - "tetahedron" read --tetrahedron--
Column 2, line 17 - "aluinosilicate" read --aluminosilicate--
Column 4, line 30 - "9" should be --90--

Column 10, line 1 - "eliminate word and"
Column 11, line 10 - "assentially" read --essentially--

SIGNED AND
SEALED
DEC 15 1970

(SEAL)
Attest:

Edward M. Fletcher, Jr.
Attesting Officer

WILLIAM E. SCHUYLER, JR.
Commissioner of Patents